Oct. 11, 1955
R. W. HEWES
2,720,640
CONTROL AND INDICATION DEVICE FOR RAILWAY
TRAFFIC CONTROLLING SYSTEMS
Filed Jan. 29, 1954
3 Sheets-Sheet 1
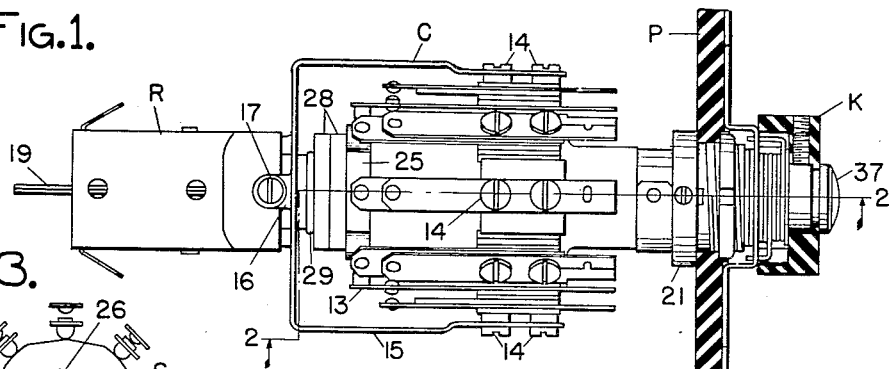
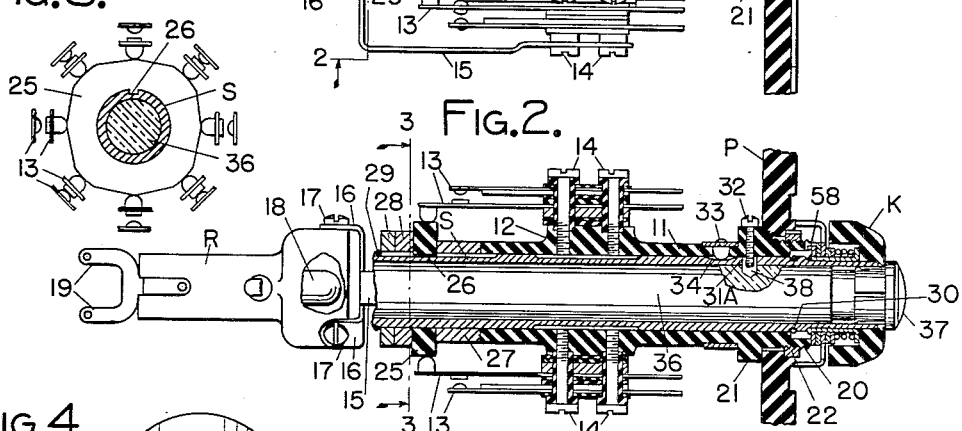
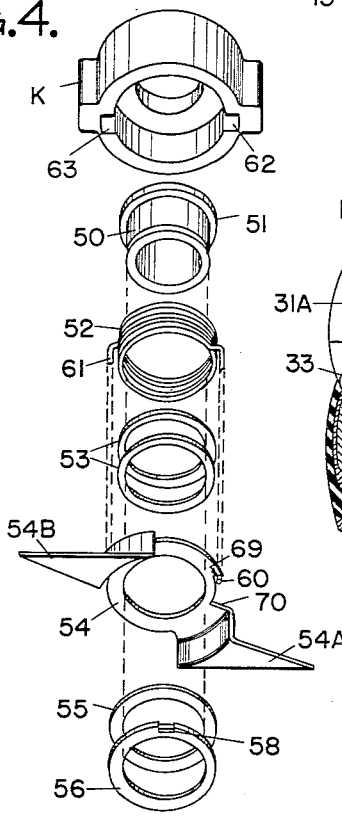
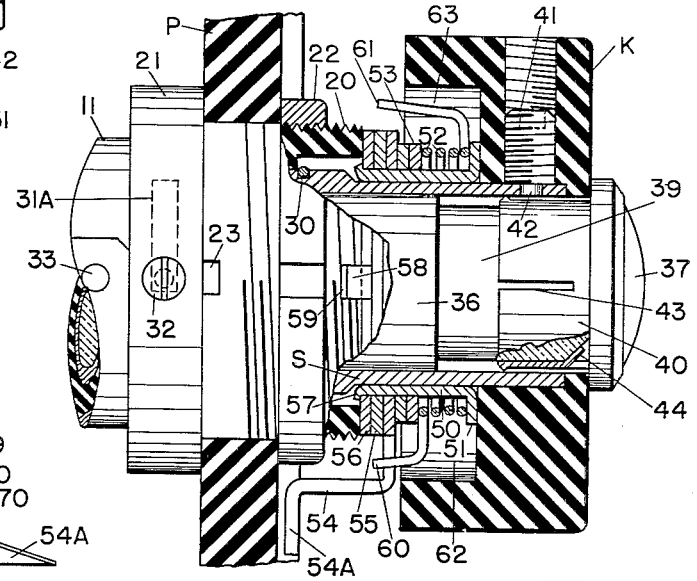
INVENTOR.
R. W. HEWES
BY Forest B. Hitchcock
HIS ATTORNEY Oct. 11, 1955   R. W. HEWES   2,720,640
CONTROL AND INDICATION DEVICE FOR RAILWAY
TRAFFIC CONTROLLING SYSTEMS
Filed Jan. 29, 1954   3 Sheets-Sheet 2

INVENTOR.
R.W.HEWES
BY
Forest B. Hitchcock
HIS ATTORNEY

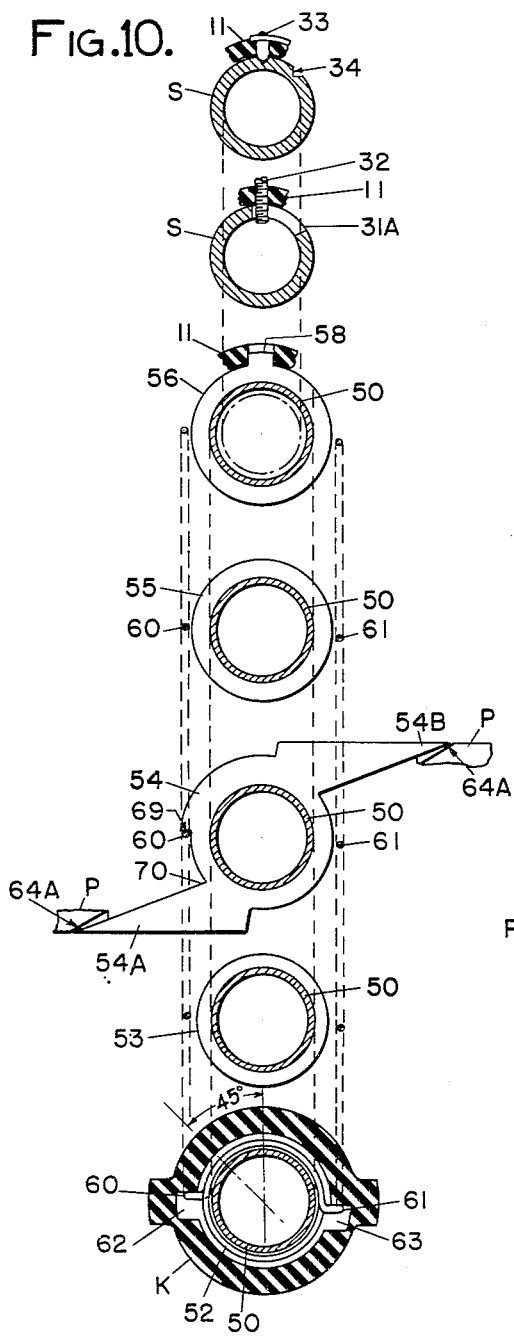
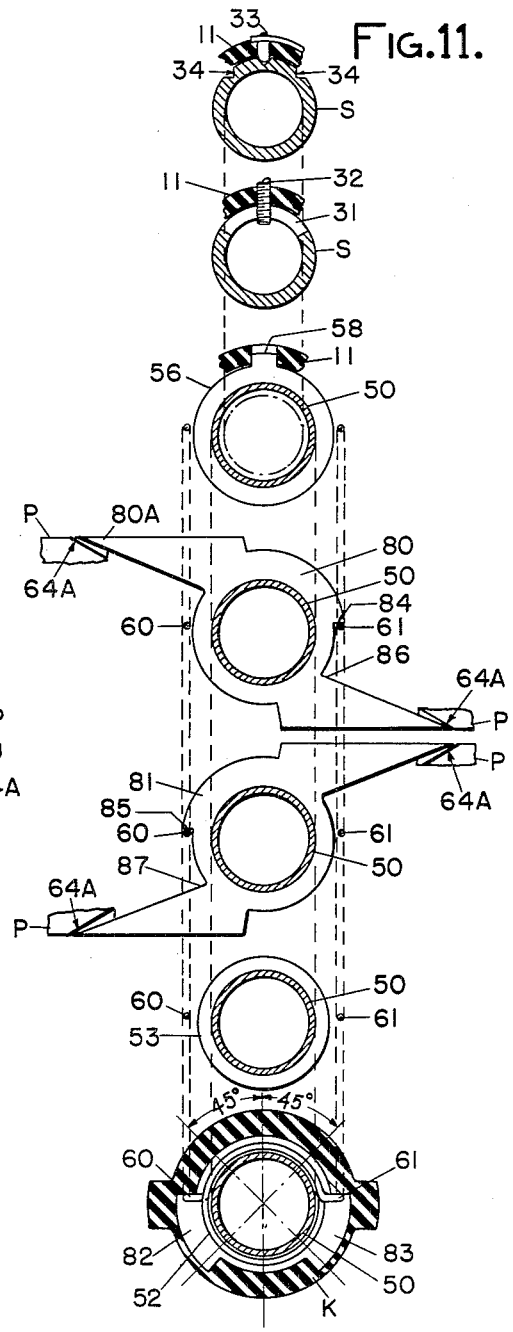

United States Patent Office 2,720,640
Patented Oct. 11, 1955

2,720,640

CONTROL AND INDICATION DEVICE FOR RAIL-
WAY TRAFFIC CONTROLLING SYSTEMS

Ralph W. Hewes, Rochester, N. Y., assignor to General
Railway Signal Company, Rochester, N. Y.

Application January 29, 1954, Serial No. 407,100

5 Claims. (Cl. 340—225)

This invention relates to control and indication devices for railway traffic controlling systems and more particularly to a control switch and indication means located in a dispatchers control office which, when operated, controls the remotely located traffic controlling devices and displays suitable indications on a control panel visible by the operator.

In railway traffic controlling systems where the track switches are controlled from a remote point, it is desirable for the operator when setting up a train route to know exactly which track switches he has operated and also get an indication that the switch mechanism has operated as intended. This is accomplished by having the operators tower provided with a control panel displaying in miniature the actual track layout which he is controlling. This control panel is provided with suitable control switches, and miniature switch points and indication lamps at each track switch location on the panel diagram. When the dispatcher operates a control switch for a certain location, circuits are controlled to properly govern the actual switch mechanism and the miniature switch points are mechanically positioned on the control panel to correspond with the new track switch position. An indication lamp is also lighted dependent upon the track switch movement.

One object of the present invention is to provide a simplified control and indication device to accomplish the desired requisites outlined above.

Another object of the invention is to provide a device which can be assembled for use at different locations on the miniature track diagrams, such as for example, right and left hand turnout sidings or right and left hand single cross overs, with very little changing of the parts.

A still further object of the invention is to provide a control and indication device which, when slightly modified, can be used at the more complicated double cross over locations where traffic moves in both directions and enters either from the right or left hand ends.

Further objects, purposes and characteristic features of the invention will appear as the description progresses and reference should be made to the accompanying drawings in which like parts are designated by like reference characters and in which:

Fig. 1 is a top plan view of the control and indication device showing the control switch, operating knob and point indicator mechanism in relation to the track layout panel to which it is fastened, with the panel and knob being shown in section for clearness;

Fig. 2 is an elevation view of the apparatus illustrated in Fig. 1, shown partly in section as indicated approximately by the line 2—2 of Fig. 1;

Fig. 3 is an end sectional view as indicated by the line 3—3 of Fig. 2 and is intended to show only the relationship between the control switch cam and the contacts which it operates;

Fig. 4 is an exploded isometric view of the control switch knob, the point indicators and their associated parts;

Fig. 5 is an enlarged sectional view of the control switch knob and switch point indicator mechanism illustrated in Fig. 1;

Fig. 10 is a diagrammatic exploded view of a single cross over switch location and is shown for the purpose of explaining the operation and interrelation of the various parts of the switch indicator control mechanism; and Fig. 11 is similar to Fig. 10 and shows a double cross over switch location.

Figure 6:
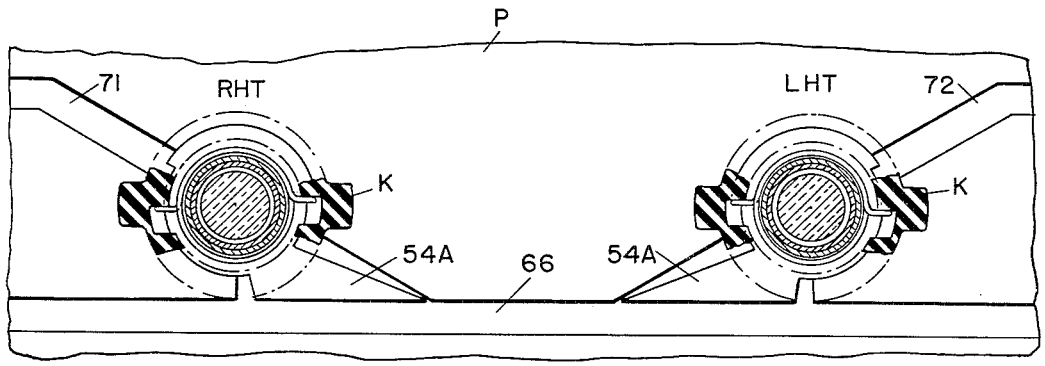
Fig. 6 is a front view of the control panel showing both a right hand and left hand siding turnout with the control knobs being partly broken away and partly in section to show their operating relationship to the switch point indicators and operating mechanism.

Referring now more particularly to Figs. 1, 2 and 3 of the drawings, there has been shown a circuit controller C to which is attached an indication lamp receptacle R. The circuit controller C is in turn mounted on a track diagram panel P. A cylindrical operating shaft S passes through the circuit controller C and is adapted to be turned to the right or left by a control knob K fastened to one end thereof. The turning of the control knob K opens or closes certain of the circuit controller contacts and also shifts the position of certain of the miniature switch point indicators with respect to the track diagram on panel P.

The circuit controller C and indication lamp receptacle R and lamp indication means form no part of the present invention and it should be understood that various types and forms could be used. For the purpose of illustrating this invention the type shown comprises a main hollow body portion 11 of suitable insulating material shaped in cylindrical form and having flat portions thereon to form an enlarged octagon shaped collar 12 around the outside center section of the cylindrical body portion 11. On each of the eight flat portions of the collar 12 there is mounted pairs of contact members 13 secured thereto by means of screws 14. The screws 14 are suitably insulated from the contact members 13.

Two of these sets of screws 14 are also used to support a U-shaped bracket 15. This bracket 15 is provided with protruding ears 16 to which is fastened, by screws 17, a lamp receptacle R. These lamp receptacles R are provided with sockets and lamps 18 as required and have external wire connectors 19.

The circuit controller C as a whole is mounted on and fastened to the back of panel P so that it is securely held thereto and prevented from turning. In the illustration shown, the cylindrical body portion 11 is provided with an enlarged end 20 which is threaded and passes through a hole in the panel P. An enlarged collar 21 bears against the back of the panel P. (Also see enlarged Fig. 5.) A spanner nut 22 is then threaded onto the enlarged end 20 and pulled up tight against the front of panel P. The collar portion 21 is provided with a key 23 which fits into a keyway in the panel P to prevent turning.

Situated within the hollow switch body portion 11 is the hollow metal operating shaft S. This shaft S is longer than the switch body portion 11 and protrudes from both ends thereof, the front end having the control knob K fastened thereto and the back end being provided with a contact operating cam 25. This cam 25 is mounted on the shaft S and is provided with a key 26 which fits into a keyway in the shaft S so that the cam 25 turns with the shaft S. In the illustration shown, the cam 25 is positioned with respect to the circuit controller contacts 13 by means of a spacing collar 27 located on the right side and two spacing collars or washers 28 located on the left side. A split ring 29 is sprung into a groove in the shaft S and bears against the outer spacing washer 28 while still another split ring 30 is sprung into another groove in the shaft S and bears against the outer edge of the body portion 11 of the circuit controller C, so that the various parts are held together and the operating shaft S is prevented from moving lengthwise within the circuit controller body portion 11.

It should be noted at this time that other combinations of contacts for the circuit controller C may call for either longer or shorter contacts and different numbers of contacts and different cams so that the means of using spacing collars for locating the cam with respect to the contacts makes the device universal in use by merely substituting different length spacing collars.

Figure 8:
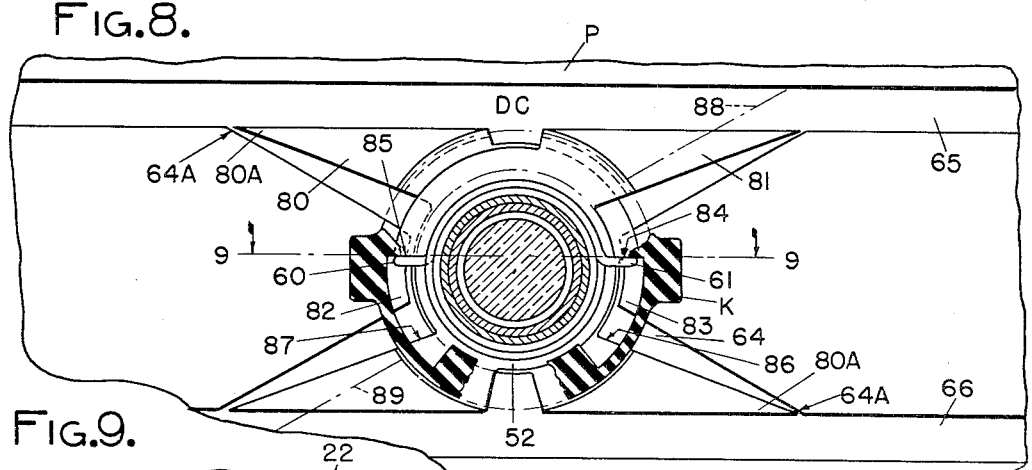
Fig. 8 is a view similar to Fig. 7 except that it shows the control panel layout arrangement for a double cross over.
Figure 9:
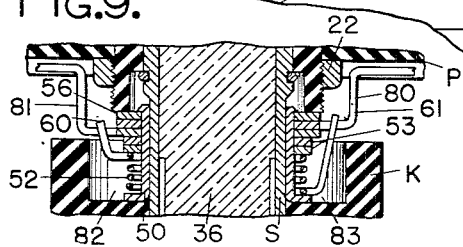
Fig. 9 is a partial sectional view taken on the line 9—9 of Fig. 8 and shows the assembly of the apparatus shown in Fig. 8.

As shown, there are four low positions and four high positions on the cam 25 which cooperate with the eight sets of circuit controller contacts 13, each located 45° from the other, so that, in each latched position of the circuit controller C, there are four sets of contacts 13 making contact and four sets of contacts 13 not making contact. In the particular applications shown, the operating shaft S is adapted to move 45° in one direction or the other or both from the normal position shown, depending upon whether the movement is to operate a left hand cross over location, a right hand cross over switch location, or a double cross over switch location. As an example, in a double cross over movement such as illustrated in Figs. 8, 9 and 11 and explained hereinafter, the operating shaft S must be able to turn 45° in either direction. The limit of movement is governed by means of a circumferential slot 31 located in the hollow operating shaft S, this circumferential slot 31 extending approximately 45° around on both sides of the shaft S from a top center point. A set screw 32, located in the switch body portion 11, extends into the slot 31 at the top center point and acts as a stop when the shaft S is turned 45° in either direction. A spring held detent device 33 is also located at the top center point of the switch body portion 11 and cooperates with detents 34 located in the operating shaft S at the top center point and both 45° positions, whereby, the shaft S is held in its rotated position after each 45° movement.

Also, as explained hereinafter, when it is desired to set up a left hand turnout or a single left hand cross over movement, the control knob K must be turned in a counterclockwise direction. This movement would require the limiting slot in the operating shaft S to extend approximately from the top center position to a 45° right hand position as shown at 31A in Figs. 5 and 10. Similarly, when it is desired to right hand turnout or a single right hand crossover movement, the control knob K must be turned in a clockwise direction, thus requiring that the limiting slot 31A in the operating shaft be located in an arc to the left of the top center position of the stop screw 32.

As previously mentioned, the lamp receptacle R houses the indication lamp or lamps 18. The light from this lamp 18 is transmitted through a translucent rod 36 to the front of the panel P and is visible through a bull's eye 37 located in the control knob K. This translucent rod 36 may be made of any suitable light transmitting substance such as plexiglas or lucite, and is cylindrical in shape and lies within the hollow operating shaft S. The set screw 32 previously mentioned extends into a detent 38 in this translucent rod 36 and locates its position lengthwise. The inner end bears against a hole (not shown) in the lamp receptacle R, and this hole allows emission of light from the lamp receptacle R. The outer or front end 39 of the translucent rod 36 is reduced in diameter so that a retainer 40 which holds the bull's eye lens 37 can be pressed into place in an opening in the front end of the control knob K. The side of the retainer 40 slides between the hollow operating shaft S and the reduced end 39 of the translucent rod 36 (see Fig. 5). The side of the retainer 40 which is cylindrical in shape is provided with several slots 43 and is formed to cause it to fit tightly over the end 39 of the translucent rod 36 rather than bear against the inside of the hollow operating shaft S. Bent-in prongs 44 which extend into slots located in the end of the translucent rod 36 prevent the retainer 40 from turning when the knob K is turned. The control knob K is fastened to the operating shaft S by means of a set screw 41 which has a small tip 42 on its inner end. The set screw 41 extends far enough into the knob K so that the tip 42 enters a hole in the shaft S.

The description thus far pertains to the circuit controller and lamp indication means and the arrangement illustrated provides a means whereby if the control knob K is turned approximately 45° to the right or left, certain circuits are made and broken as intended. Also, the arrangement includes a means whereby if an indication has been received that a certain switch operating function has been completed, an indication lamp will light up and light will be transmitted to a bull's eye 37 where it will be visible on the front of the panel P.

Referring now more particularly to the switch point indicators which cooperate with the track layout diagram on the front of the control panel P, as previously mentioned, the actual switch locations may comprise a siding turnout, a single crossover or a double crossover. With particular reference to Figs. 4, 5, 7 and 10 of the drawings, there has been shown single crossover locations as these types of locations are the most common. A switch point indicator comprises a unit assembly which fits loosely over the operating shaft S and is located between the circuit controller housing 11 and the control knob K. The movement of the control knob K also provides the means by which the switch point indicators are positioned.

The switch point indicator assembly comprises a spool-like retainer 50 formed with a flange 51 on one end thereof. Loosely mounted on the retainer 50 in the following order is a combined torsion and compression spring 52, two friction washers 53, a switch point indicator 54, another friction washer 55 and an end plate 56. The open end of the retainer 50 is spun over so that it forms a flange 57 which bears against the end plate 56. Thus, a complete single unit assembly is formed in which the spring 52 is under compression and forces the friction washers 53 and 55 and the switch point indicator 54 against the end plate 56. The end plate 56 is provided with a projecting ear or key 58 which fits into a groove or keyway 59 in the enlarged end 20 of the circuit controller housing 11. This prevents end plate 56 from turning. The free ends 60 and 61 of the spring 52 are bent outwardly in a direction pointing away from the control knob K and are contained within the limits of slots or sockets 62 and 63 formed in the inside face of the control knob K.

The main body portion of the switch point indicator 54 is cup shaped and has two triangular projections 54A and 54B extending outwardly at opposite angles to each other. These two projections 54A and 54B of the switch point indicator 54 are situated in recessed portions 64 in the panel P which extend across the panel at the switch locations and connect onto the two grooves 65 and 66 which represent the two tracks that are being connected together by a cross-over. It can be seen by reference to the switch location LHC of Fig. 7, that a movement of the switch point indicator 54 to its other extreme position will place its projecting points 54A and 54B in a position as indicated by the dot and dash lines 67 and 68. This forms a continuous groove or miniature track which extends from the groove 65, through the switch location LHC, over to the other groove 66. This condition indicates that the track has been set up for a left-hand crossover movement through the switch location LHC.

The construction of the switch point indicator just described provides an assembly which may be called a slip friction clutch, the end plate 56 being held in a fixed position by means of key 58 while the free ends 60 and 61 of the torsion compression spring 52 are located within the sockets 62 and 63 of the control knob K whereby the spring 52 will be affected by movement of the knob K. In the normal position of the control knob K as shown, the spring end 60 bears against the upper side of the knob socket 62 and a shoulder 69 (see Fig. 10) formed in the face portion of the switch point indicator 54 while the other spring end 61 bears against the upper side of the knob socket 63. Referring again to the switch location LHC of Fig. 7 and the diagrammatic illustration of Fig. 10, when it is desired to set up a left-hand crossover train movement, the knob K is turned in a counterclockwise direction. During the first part of the movement the knob socket 62 moves the spring end 60 away from the shoulder 69 on the switch point indicator 54, the spring 52 following the movement of the knob K by turning on the retainer 50. As the friction between the face of the washer 53 and the face of the spring 52 is very little, only the spring 52 turns during this initial movement of the knob K. The switch point indicator 54 is held stationary by the force exerted by the compression spring 52. As the movement of the knob K continues, the spring end 60 will come in contact with the edge 70 of the switch point indicator projection 54A and drive the switch point indicator 54 to its operated position as indicated by the dot and dash lines 67 and 68.

As previously mentioned, the control knob K is moved approximately 45° in a counterclockwise direction as determined by the length of the circumferential slot 31A in the shaft S to complete its function of operating contacts 13 and the switch point indicator 54. At this point in the operation, the detent device 33 enters a detent 34 in the shaft S and holds the shaft S and the knob K and the switch point indicator 54 at their operated positions. When it is desired to operate the control knob K and the switch point indicator 54 back to the normal position, the knob K is turned in a clockwise direction. The first part of the movement will be lost motion so far as the switch point indicator 54 is concerned but the spring 52 will move with the knob K because the upper edge of the socket 63 is bearing against the spring end 61. Further movement of the knob K will bring the spring end 60 into contact with the shoulder 69 of the switch point indicator 54 and move it back to its normal position as shown, wherein it is held by the detent device 33 which enters the other detent 34.

Figure 7:
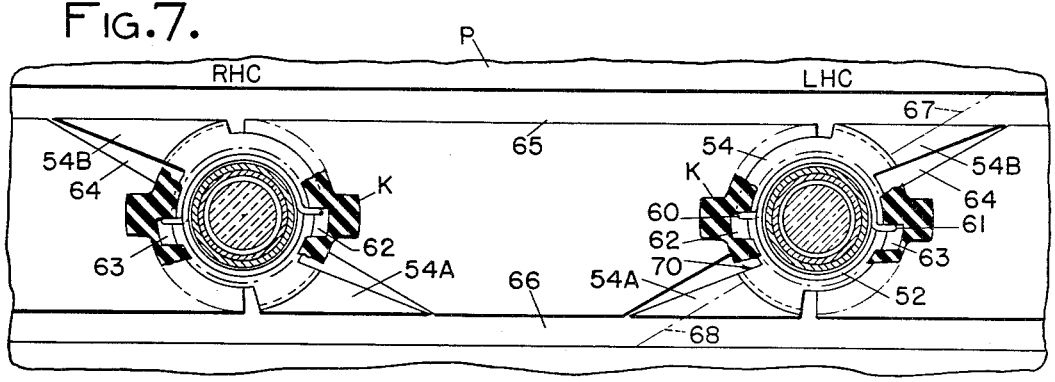
Fig. 7 is a view similar to Fig. 6 and shows the control panel layout for both a right hand and a left hand cross over.

The other switch location shown in Fig. 7 represents a right hand crossover and is designated RHC. The apparatus for this switch location RHC is similar to that of switch location LHC except that the control knob sockets 62 and 63, the circumferential slot 31 in the shaft S and the switch point indicator projections 54A and 54B and shoulder 69 are located on opposite sides of the vertical centerline as compared to the location of the same parts at switch location LHC. When setting up a route for a right hand crossover movement, the control knob K must now be turned in a clockwise direction and the same functions are performed as previously described in connection with the switch location LHC. The switch point indicator 54 follows the knob K in a clockwise direction movement.

With reference to Fig. 6, it will be seen that the groove 66 in the panel P representing a through track is the same as that shown in Fig. 7, but the through track groove 65 has been eliminated and sidings 71 and 72 shown in its place. The apparatus shown at the switch locations RHT and LHT is the same as in Fig. 7 except that only the switch points 54A have been shown, the other switch points 54B not being needed. In this instance, if a route is to be set up through the switch location RHT connecting the siding 71 and the through track 66, it is merely necessary to turn the control knob K in a clockwise direction the same as was done in connection with setting up a crossover movement through the switch location RHC of Fig. 7. In other words, the apparatus and the controls for a right hand siding turnout of Fig. 6 and a right hand crossover of Fig. 7 are the same except that one switch point only is required for a siding turnout whereas two switch points are required for a crossover. The same thing is true when comparing a left hand siding turnout and a left hand crossover.

Referring now to a double crossover such as switch location DC shown in Figs. 8, 9 and 11, it is necessary to have two sets of switch point indicators such as 80 and 81, both operated by the same control knob K. In other words, it is necessary to accomplish the same functions with one control knob as were accomplished with two control knobs in the previously described right hand and left hand crossovers. In this assembly the washer 55 is removed and the extra switch point indicator is substituted in its place. The slip friction clutch otherwise is the same as previously described. The panel P is provided with the usual grooves 65 and 66 which simulate the two through tracks and the cutaway portion 64 in the face of the panel P is enlarged to accommodate the two switch point indicators 80 and 81. The control knob K is of the same general design except that the two sockets 82 and 83 which contact the spring ends 60 and 61 are long enough to extend through an arc greater than the 45° movement of the knob K when operated, for reasons explained hereinafter. The switch point indicator 80 is provided with a shoulder 84 which cooperates with the spring end 61 while the switch point indicator 81 is provided with a shoulder 85 which cooperates with the spring end 60. It should be noted that the shoulder 84 and the upper edge of socket 83 are directly in line and the spring end 61 bears against the flat side of each. The same is true with respect to shoulder 85, the upper edge of socket 82 and the spring end 60.

Assuming that a route is to be set up to provide a left hand crossover movement connecting the two tracks as simulated by the grooves 65 and 66 on panel P, the knob K is turned in a counterclockwise direction. The upper edge of the knob socket 82 engages the spring end 60, causing it to move with the knob and away from the shoulder 85 on the switch point indicator 81. The other end 61 of the spring 52 is bearing against the shoulder 84 on the switch point indicator 80 and cannot move as the tips 80A of the indicator 80 are bearing against the shoulders 64A formed by the groove 64. This causes the spring 52 to wind up rather than turn and builds up a torque therein. Near the end of the 45° movement of the knob K, the spring end 60 engages the edge 87 of the switch point indicator 81 and moves it to its operated position as indicated by the dot and dash lines 88 and 89. Meanwhile, the upper edge of the socket 83 has moved away from the spring end 61 which is held by the shoulder 84 and the length of the socket 83 has allowed movement of the knob K to its operated position, where it is held by the detent device 33—34 as previously described. The track diagram on the panel P will now indicate that the track route is set up for the left hand crossover movement mentioned above.

The apparatus may be returned to its normal position as shown by turning the knob K in a clockwise direction. As the knob is turned, the spring end 60 will follow as the torque built up in the spring 52 will tend to unwind the spring and return it to its normal position. Near the end of its movement the spring end 60 will engage the shoulder 85 of the switch point indicator 81 and return it to its normal position. As previously mentioned, the friction created between the various parts of the slip friction clutch assembly caused by the compression of the spring 52 is enough to hold the switch point indicator 81 in a stationary position until actual contact is made by the spring end 60 and shoulder 85. In this particular assembly of a double crossover location, the remaining torque energy built up in the wound up spring 52 is enough to overcome this friction and move the switch point indicator 81.

When it is desired to set up a route for a right hand crossover movement, the knob K is turned in a clockwise direction and the switch point indicator 80 is moved while the switch point indicator 81 remains stationary which is just the reverse of the movements required for a left hand crossover route. In this instance the spring end 61 will be moved by the upper shoulder of the knob socket 83 while the spring end 60 is held against the shoulder 85 of the switch point indicator 81. When the spring end 61 has travelled far enough it will engage the edge 86 of the switch point indicator 80 and move it to its operated position. The return to normal movement is also similar to that described above in connection with a left hand crossover movement, except that the spring end 61 does the driving.

From the foregoing description and with reference to the accompanying drawings, it should be understood that in the various operational movements shown and described, in each instance a 45° arcuate limited movement of the knob K will make and break certain desired contact groups 13 and also operate certain switch point indicators in accordance with the direction of movement of the knob K. This provides energy to operate the remote switch mechanism and at the same time displays a visual indication of the switch position on the control panel P.

The indication lamp 18 is suitably controlled to give the desired information that the switch has responded to its control. This can be done in different ways. For example, the lamp can be intermittently lighted when the switch is out of correspondence or it can be steadily lighted when in correspondence or any other arrangement but this has nothing to do with the invention and is not shown.

It should also be seen and understood that the invention may be applied to various types of switch locations as shown with very little changing of the parts and that the movement of the control knob K in each instance is confined within certain limitations so that false movements and indications are prevented.

Having shown and described one form of the invention as applied to various types of switch movements, it is desired to be understood that the invention could assume other forms of structure and detail without departing from the spirit or scope of the present invention as defined in the appending claims.

What I claim is:

1. A control and indication device for railway traffic control machines comprising, a control panel having simulated railroad tracks and track switches inscribed in the face thereof, a circuit controller mounted on the back of said panel, a shaft extending through said circuit controller and said control panel and protruding from each end thereof, a contact operating cam on one end of said shaft and a control knob on the other end of said shaft, a switch point indicator mounted loosely on said shaft and positioned between said control panel and said control knob, and a lost-motion operating means connected between said switch point indicator and said control knob, whereby a rotary movement of said control knob will operate contacts on said circuit controller and position said switch point indicator with respect to the track and switch diagram on said panel.

2. A control and indication device for railway traffic control machines comprising, a control panel having simulated railroad tracks and track switches inscribed on the face thereof, a circuit controller having a hollow housing with multiple contacts and an indication lamp mounted thereon and constructed to be fastened to the back of said panel at each of said track switch locations, a hollow shaft extending through said circuit controller hollow housing and protruding from each end thereof, said shaft being adapted to turn a predetermined distance within said circuit controller hollow housing but having its endwise movement restricted, a contact operating cam on one end of said shaft and a turn type control knob on the other end of said shaft, a switch point indicator mounted loosely on said shaft and positioned between said control panel and said control knob to cooperate with said panel track diagram, a translucent rod within said hollow shaft for transmitting light from said indication lamp to said control knob, and a lost-motion operating means connected between said switch point indicator and said control knob, whereby the first part of a rotary movement of said control knob will operate said contacts and the last part of said rotary movement will position said switch point indicator with respect to said panel track diagram.

3. In a control and indication device for a control machine panel having a track diagram displayed thereon, a shaft extending through the panel and having a control knob attached thereto, a switch point indicator assembly mounted on said shaft and positioned between the panel track diagram and said control knob, said switch point indicator assembly comprising a stationary spool having loosely mounted thereon a switch point indicator, washers and a compressed coil spring in a manner to form a slip clutch arrangement, said compressed coil spring having extended ends which engage shoulders on both the said switch point indicator and control knob, whereby a rotary movement of said control knob in one direction will operate said switch point indicator to a closed switch position while a return rotary movement of said control knob in the other direction will operate said switch point indicator to an open switch position.

4. In a control and indication device for a control machine panel having a track diagram displayed thereon, a shaft extending through the panel and having a switch point indicator assembly loosely mounted thereon and located at a switch location on the panel track diagram, said switch point indicator assembly comprising an anchored spool having loosely mounted thereon a switch point indicator, friction washers and a compressed coil spring, said compressed coil spring having first and second extended ends, the first end of which is positioned to engage first and second shoulders on said switch point indicator, said shaft being provided with stops to limit the direction and amount of rotary movement, a turn type control knob fastened to the end of said shaft, said control knob having a first shoulder located so that a rotary movement of said control knob in one direction will cause said first knob shoulder to engage said first spring end which in turn will engage said first switch point indicator shoulder and drive said switch point indicator to a closed switch position, said control knob having a second shoulder located so that a rotary movement of said control knob in the opposite direction will cause said second knob shoulder to engage said second spring end which in turn will cause said first spring end to engage said second switch point indicator shoulder and drive said switch point indicator back to an open switch position, a spring held detent device to hold said shaft in its last operated position, whereby there is lost motion between the movement of said control knob and said switch point indicator by reason of the slip clutch action of said switch point indicator assembly.

5. In a control and indication device for a control machine panel having a track diagram displayed thereon, a shaft extending through the panel and having a switch point indicator assembly loosely mounted thereon and located at a switch location on the panel track diagram, said switch point indicator assembly comprising an anchored spool having loosely mounted thereon switch point indicators, friction washers and a compressed coil spring, said compressed coil spring having left and right extended ends, the left end positioned to engage upper and lower shoulders on the first of said switch point indicators, the right end positioned to engage upper and lower shoulders on the second of said switch point indicators, said shaft being provided with stops to limit the amount of rotary movement in either direction from top center position, a turn type control knob fastened to the end of said shaft, said control knob having a left shoulder located so that a left hand rotary movement of said control knob from its normal position will cause said left knob shoulder to engage said left spring end which in turn will engage said lower shoulder of said first switch point indicator and drive it to a closed switch position, said right spring end being held against said upper shoulder of said second switch point indicator thereby creating a torque in said compressed coil spring so that a reverse back to normal rotary movement of said control knob will release the built up torque in said compression spring and allow said left spring end to engage said upper shoulder of said first switch point indicator and drive it back to an open switch position, said control knob having a right shoulder located so that a right hand rotary movement of said control knob from its normal position will cause said right hand shoulder to engage said right spring end which in turn will engage said lower shoulder of said second switch point indicator and drive it to a closed switch position, said left spring end being held against said upper shoulder of said first switch point indicator thereby creating a torque in said compressed coil spring so that a reverse back to normal rotary movement of said control knob will release the built up torque in said compressed coil spring and allow said right hand spring end to engage said upper shoulder of said switch point indicator and drive it back to an open switch position, a spring held detent device to hold said shaft in its last operated position, whereby there is lost motion between the movement of said control knob and said switch point indicators by reason of the slip clutch action of said switch point indicator assembly.

References Cited in the file of this patent

UNITED STATES PATENTS

| | | |
|---|---|---|
| 1,973,630 | Johnson | Sept. 11, 1934 |
| 2,094,134 | Obergfell | Sept. 28, 1937 |